US011909903B2

(12) United States Patent
Lee et al.

(10) Patent No.: US 11,909,903 B2
(45) Date of Patent: Feb. 20, 2024

(54) SYSTEM AND METHOD OF MANAGING CONTACT INFORMATION OF A TERMINAL RECOGNIZED BY A VEHICLE

(71) Applicants: HYUNDAI MOTOR COMPANY, Seoul (KR); KIA CORPORATION, Seoul (KR)

(72) Inventors: Hyun-Woo Lee, Seoul (KR); Seo-Hwan Choi, Seoul (KR); Seong-Soo Yae, Hwaseong-si (KR); Paul Choo, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 390 days.

(21) Appl. No.: 17/406,941

(22) Filed: Aug. 19, 2021

(65) Prior Publication Data
US 2022/0210258 A1   Jun. 30, 2022

(30) Foreign Application Priority Data
Dec. 29, 2020   (KR) .......................... 10-2020-0186270

(51) Int. Cl.
*H04M 1/2757* (2020.01)
*H04M 1/72409* (2021.01)
*B60K 35/00* (2006.01)
*G06F 16/23* (2019.01)

(52) U.S. Cl.
CPC ........... *H04M 1/2757* (2020.01); *B60K 35/00* (2013.01); *G06F 16/23* (2019.01); *H04M 1/72409* (2021.01); *B60K 2370/592* (2019.05); *B60K 2370/5911* (2019.05)

(58) Field of Classification Search
CPC ....................... H04M 1/2757; H04M 1/72409
See application file for complete search history.

(56) References Cited

U.S. PATENT DOCUMENTS 9,544,414  B2 *  1/2017  Kim ..................... B60K 37/06
2018/0262834 A1 *  9/2018  Cho ........................ G06F 3/16

* cited by examiner

*Primary Examiner* — Amal S Zenati
(74) *Attorney, Agent, or Firm* — Lempia Summerfield Katz LLC

(57) ABSTRACT

A system and a method of managing contact information of a terminal recognized by a vehicle include: a communication unit, which communicates with one or more terminals located in a vehicle and recognizes the terminal, and which receives information stored in the recognized terminal; a connection confirming unit which confirms a function, to which the terminal recognized through the communication unit is connected through communication, among the functions provided by an Audio, Video, and Navigation (AVN) system of the vehicle; a priority calculating unit, which calculates a priority of the terminal with respect to other terminals according to the connection between the terminal confirmed by the connection confirming unit and the function provided by the AVN system and generates priority list information for maintaining contact information stored in the terminal; and a contact information renewing unit, which downloads and stores the contact information stored in the terminal in a linked database according to the priority list information generated by the priority calculating unit or deletes the contact information stored in the database.

7 Claims, 4 Drawing Sheets

SYSTEM AND METHOD OF MANAGING CONTACT INFORMATION OF A TERMINAL RECOGNIZED BY A VEHICLE

CROSS-REFERENCE TO RELATED APPLICATIONS

This application claims priority under 35 U.S.C. § 119 to Korean Patent Application No. 10-2020-0186270, filed on Dec. 29, 2020, in the Korean Intellectual Property Office, the disclosure of which is incorporated herein by reference in its entirety.

BACKGROUND

1. Field of the Disclosure

The present disclosure relates to a system and a method of managing contact information stored in a terminal recognized by a vehicle, and more particularly, the system includes: a communication unit, which communicates with one or more terminals located in a vehicle and recognizes the terminal, and which receives information stored in the recognized terminal. The system further includes a connection confirming unit, which confirms a function, to which the terminal recognized through the communication unit is connected through communication, among the functions provided by an Audio, Video, and Navigation (AVN) system of the vehicle. The system further includes a priority calculating unit, which calculates a priority of the corresponding terminal with respect to other terminals according to the connection between the terminal confirmed by the connection confirming unit and the function provided by the AVN system and generates priority list information for maintaining contact information stored in the terminal. The system further includes a contact information renewing unit, which downloads and stores the contact information stored in the terminal in a linked database according to the priority list information generated by the priority calculating unit or deletes the contact information stored in the database.

2. Description of the Related Art

In general, an Audio, Video, Navigation (AVN) system is installed in a vehicle to play sound or video content and drive a navigation device installed in the vehicle.

The AVN system may perform wired or wireless communication with a terminal of a user, such as a mobile phone, a notebook computer, and a Personal Digital Assistant (PDA), located inside the vehicle and may transceive information stored in the terminal.

The communication between the AVN system of the vehicle and the terminal of the user mainly uses a wireless communication method, representatively, Bluetooth and a wireless Internet connection.

Among the services provided by the vehicle's AVN system, there is a hands-free function. The function is a system that allows the AVN system of the vehicle to communicate with the mobile phone of the user in a Bluetooth method so that the user can receive a call from the mobile phone by using the AVN system and make a call by calling a contact stored in the mobile phone.

In order to perform the hands-free function, the AVN system performs wireless communication with the mobile phone of the user to register the corresponding mobile phone in the AVN system, receives contact information, such as a phone number, stored in the mobile phone, and displays phone number information on a display means of the AVN system when performing the hands-free function.

However, in the case where a data capacity of the contact information stored in the terminal of the user is significantly large when the AVN system communicates with the terminal of the user, the number of terminals that can be registered in the AVN system is limited by the size of the data that can be registered in the AVN system.

SUMMARY

The present disclosure has been made in an effort to solve the problems and provides a system and method of managing contact information stored in a corresponding terminal according to a priority of a user's terminal based on a history using functions provided by an Audio, Video, and Navigation (AVN) system inside a vehicle.

An embodiment of the present disclosure provides a system and a method of managing contact information stored in a terminal recognized by a vehicle. The system includes: a communication unit, which communicates with one or more terminals located in a vehicle and recognizes the terminal, and which receives information stored in the recognized terminal. The system further includes a connection confirming unit, which confirms a function, to which the terminal recognized through the communication unit is connected through communication, among the functions provided by an AVN system of the vehicle. The system further includes a priority calculating unit, which calculates a priority of the corresponding terminal with respect to other terminals according to the connection between the terminal confirmed by the connection confirming unit and the function provided by the AVN system and generates priority list information for maintaining contact information stored in the terminal. The system further includes a contact information renewing unit, which downloads and stores the contact information stored in the terminal in a linked database according to the priority list information generated by the priority calculating unit or deletes the contact information stored in the database.

The system and method of managing contact information of a terminal recognized by a vehicle of the present disclosure including the foregoing configuration may maintain the contact information stored in the terminals connected to an AVN system of the vehicle according to the priority of the device as much as possible. Therefore, it is possible to provide the user with the contact information by shortening the waiting time of the service using the contact information, thereby improving user convenience.

DETAILED DESCRIPTION OF THE EMBODIMENTS

Hereinafter, a configuration and an operation of a system and a method of managing contact information of a terminal recognized by a vehicle of the present disclosure are described in detail with reference to the drawings.

However, the disclosed drawings are provided as an example for fully delivering the spirit of the present disclosure to those having ordinary skill in the art. Accordingly, the present disclosure is not limited to the drawings presented below and may also be specified in other aspects.

Unless otherwise defined, the terms used in the specification of the present disclosure have the meanings commonly understood by those having ordinary skill in the art. The detailed descriptions of well-known functions and configurations have been omitted in the description below and the accompanying drawings to avoid obscuring the subject matter of the present disclosure. When a component, device, element, or the like of the present disclosure is described as having a purpose or performing an operation, function, or the like, the component, device, or element should be considered herein as being "configured to" meet that purpose or to perform that operation or function.

Figure 1:
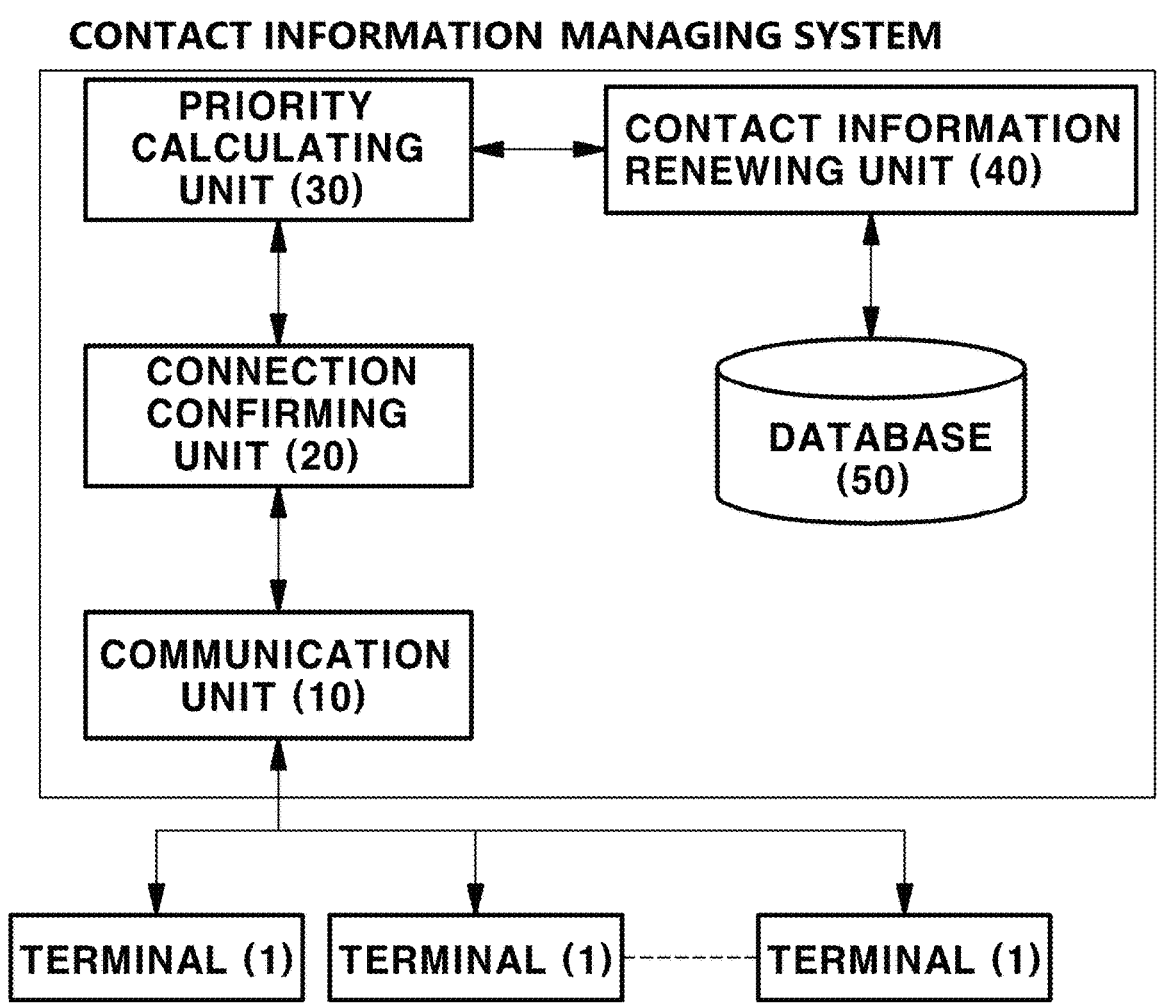
FIG. 1 is a block diagram illustrating a system for managing contact information of the present disclosure.

FIG. 1 is a block diagram of a system for managing contact information of the present disclosure.

Referring to the drawing, the system for managing contact information of the present disclosure includes a communication unit 10, which communicates with one or more terminals 1 located in a vehicle and recognizes the terminal 1, and which receives information stored in the recognized terminal 1. The system further includes a connection confirming unit 20, which confirms a function, to which the terminal 1 recognized through the communication unit 10 is connected through communication, among the functions provided by an Audio, Video, and Navigation (AVN) system of the vehicle. The system further includes a priority calculating unit 30, which calculates a priority of the corresponding terminal 1 with respect to other terminals according to the connection between the terminal 1 confirmed by the connection confirming unit 20 and the function provided by the AVN system and generates priority list information for maintaining contact information stored in the terminal 1. The system further includes a contact information renewing unit 40, which downloads and stores the contact information stored in the terminal 1 in a linked database 50 according to the priority list information generated by the priority calculating unit 30 or deletes the contact information stored in the database 50.

The terminal 1 is the terminal 1 of a user using the AVN system of the vehicle, and refers to a terminal, such as a general mobile phone, smart phone, tablet computer, notebook computer, Personal Digital Assistant (PDA), and a Personal Computer (PC).

The communication unit 10 is the publicly known wired or wireless communication unit for performing communication with the terminal 1. In an embodiment, the communication unit 10 may perform Bluetooth or wireless Internet communication, and more particularly, may be a Bluetooth communication unit that is an in-vehicle short range communication means.

In the meantime, the system for managing contact information of the present disclosure including the foregoing configuration may also be included as a part of the AVN system of the vehicle.

Hereinafter, a method of managing contact information performed by the system for managing contact information of the present disclosure including the foregoing configuration is described.

Figure 2:
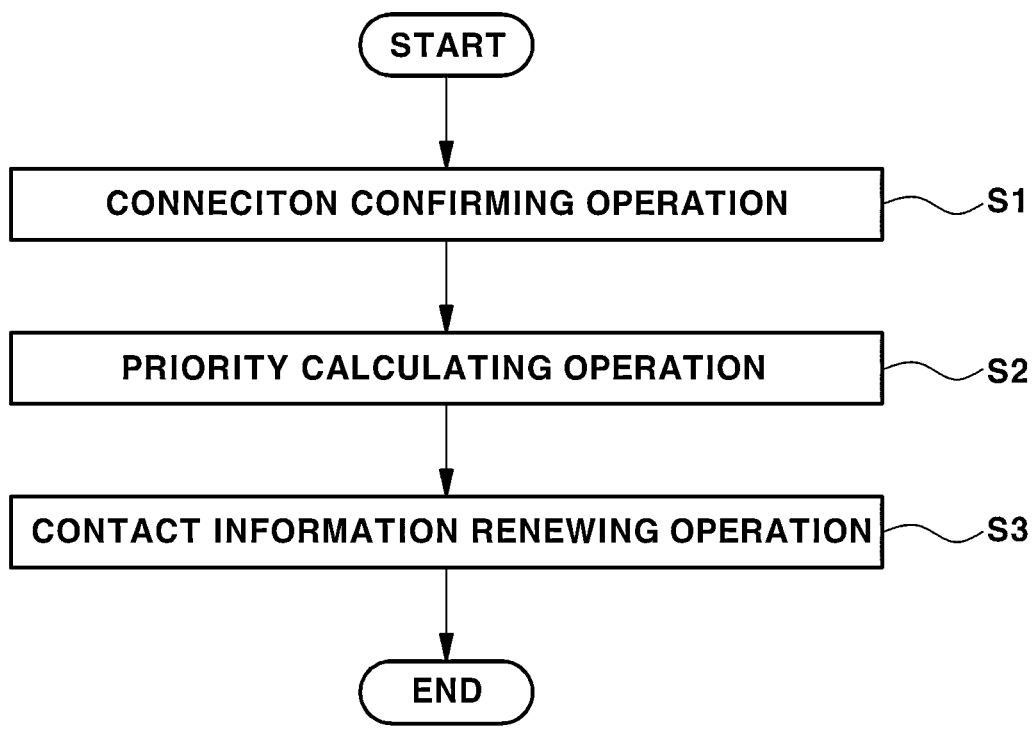
FIG. 2 is a flowchart of a method of managing contact information of the present disclosure.

FIG. 2 is a flowchart of the method of managing contact information of the present disclosure.

The method of managing contact information of the present disclosure is performed by the system for managing contact information of the present disclosure. The system includes the communication unit 10 communicating with one or more terminals 1 located in the vehicle, the connection confirming unit 20, the priority calculating unit 30, and the contact information renewing unit 40.

Referring to the drawing, the method of managing contact information of the present disclosure includes: a connection confirming process S1 of confirming a function, to which the terminal 1 located in a vehicle and recognized through the communication unit 10 is connected through communication, among the functions provided by the AVN system of the vehicle, which is performed by the connection confirming unit 20. The method further includes a priority calculating process S2 of calculating a priority of the corresponding terminal 1 with respect to other terminals according to the connection between the terminal 1 confirmed in the connection confirming process S1 and the function provided by the AVN system and generating priority list information for maintaining contact information stored in the terminal 1, which is performed by the priority calculating unit 30. The method further includes a contact information renewing process S3 of downloading and storing the contact information stored in the terminal 1 in a linked database 50 according to the priority list information generated by the priority calculating process S2 or deleting the contact information stored in the database 50, which is performed by the contact information renewing unit 40.

Figure 3:
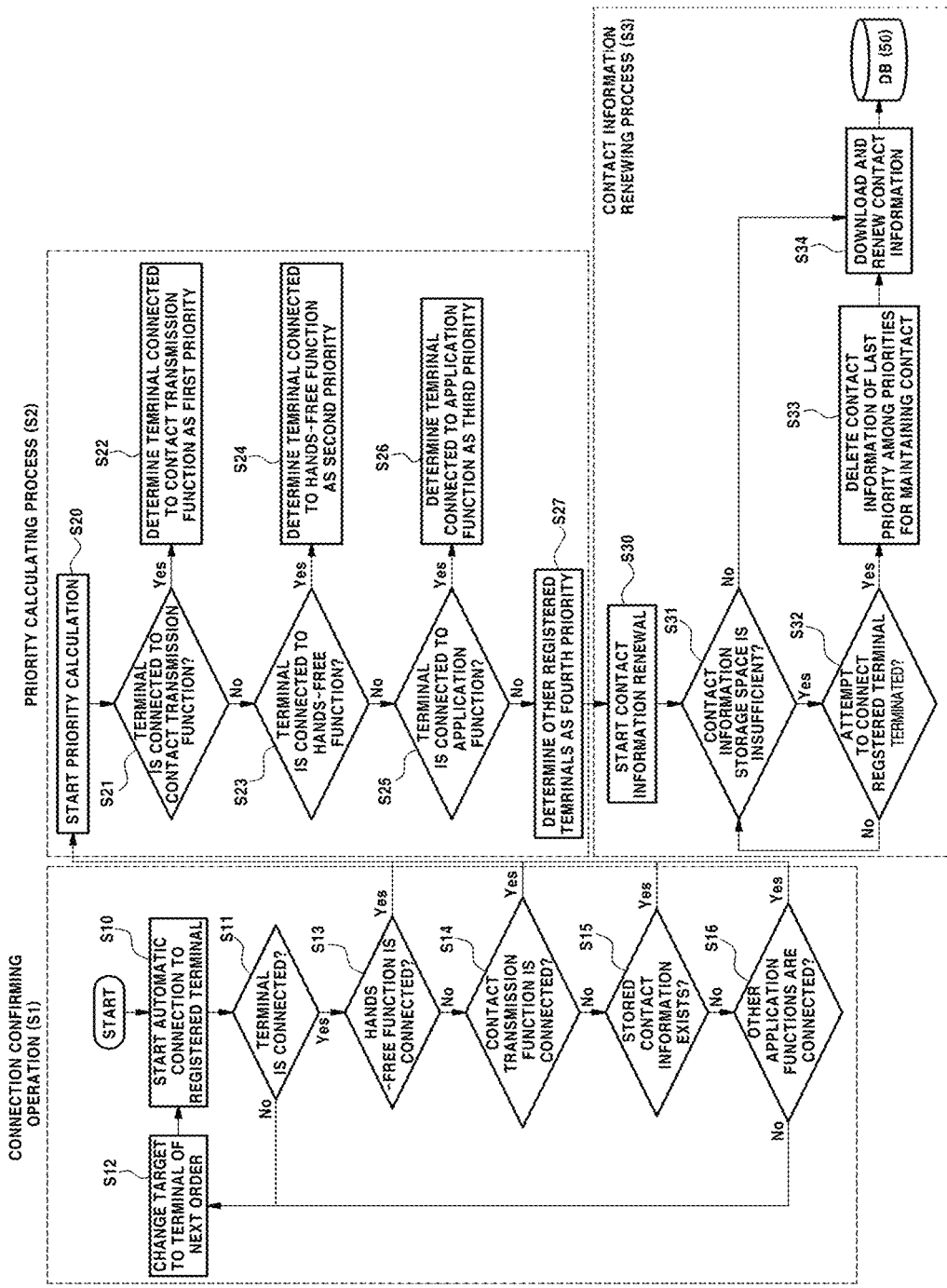
FIG. 3 is a detailed flowchart of the method of managing contact information of the present disclosure.

The method of managing contact information of the present disclosure including the foregoing configuration is described in more detail. FIG. 3 is a detailed flowchart of the method of managing contact information of the present disclosure and illustrates the method of managing contact information of the present disclosure described in FIG. 2 according to each operation in a modified manner.

1) Connection Confirming Process S1

Referring to the drawing, in the connection confirming process S1 of the method of managing contact information of the present disclosure, when the terminal 1 of the user is located in the vehicle, the communication unit 10 starts a connection with the terminals 1 registered in the AVN system of the vehicle through communication (S10).

Then, the connection confirming unit 20 determines whether the terminal 1 registered in the AVN system of the vehicle is connected through communication as a result of the connection with the communication unit 10 through communication (S11. When the terminal 1 is connected through communication, the connection confirming unit 20 determines whether the corresponding terminals 1 is connected with a hands-free function provided by the AVN system of the vehicle through communication (S13).

However, when the corresponding terminal 1 is not connected through communication, the connection confirming unit 20 changes a communication target to a terminal of a next order (S12) and starts a connection through communication.

When the corresponding terminal 1 is connected with a hands-free function through communication as a result of the determination of operation S13, a priority calculating starting operation S20 for performing the priority calculating process S2 is performed. When the corresponding terminal 1 is not connected with a hands-free function through communication, the connection confirming unit 20 determines whether the corresponding terminal 1 is connected with a contact information transmission function provided by the AVN system of the vehicle through communication (S14).

When the corresponding terminal 1 is connected with the contact information transmission function through communication as a result of the determination of operation S14, the priority calculating starting operation S20 for performing the priority calculating process S2 is performed. When the corresponding terminal 1 is not connected with the contact information transmission function through communication, the connection confirming unit 20 determines whether the contact information of the corresponding terminal 1 is previously stored and exists in the AVN system of the vehicle (S15).

When the contact information of the corresponding terminal 1 is previously stored and exists in the AVN system as a result of the determination of operation S15, the priority calculating starting operation S20 for performing the priority calculating process S2 is performed. When the contact information of the corresponding terminal 1 is not previously stored and does not exist in the AVN system, the connection confirming unit 20 determines whether the corresponding terminal 1 is connected to another application function provided by the AVN system of the vehicle, other than the hands-free function or the contact information transmission function, through communication (S16).

Herein, another application function provided by the AVN system may include, for example, a function of transmitting or receiving a text message or an SNS message to or from a contact stored in the terminal 1, and an audio and video streaming function of streaming and playing an audio file, a video file, and the like stored in the terminal 1.

When the corresponding terminal 1 is connected to another application function through communication as a result of the determination of operation S16, the priority calculating starting operation S20 for performing the priority calculating process S2 is performed. When the corresponding terminal 1 is not connected to another function through communication, the connection confirming unit 20 changes the communication target to a terminal of a next order (S12) and starts a connection through communication.

2) Priority Calculating Process S2

In the priority calculating process S2 of the present disclosure, the priority calculating unit 30 determines whether the corresponding terminal 1 is connected to the contact information transmission function in the priority calculating starting operation S20 (S21). When the corresponding terminal 1 is connected to the contact information transmission function as a result of the determination, the priority calculating unit 30 determines the corresponding terminal 1 as the terminal of the first priority for maintaining the priority of the contact information and generates priority list information (S22).

Next, when the corresponding terminal 1 is not connected to the contact information transmission function as a result of the determination of operation S21, the priority calculating unit 30 determines whether the corresponding terminal 1 is connected to the hands-free function (S23). When the corresponding terminal 1 is connected to the hands-free function as a result of the determination, the priority calculating unit 30 determines the corresponding terminal 1 as the terminal of the second priority for maintaining the priority of the contact information and generates priority list information (S24).

Next, when the corresponding terminal 1 is not connected to the hands-free function as a result of the determination of operation S23, the priority calculating unit 30 determines whether the corresponding terminal 1 is connected to another application function provided by the AVN system of the vehicle, other than the hands-free function or the contact information transmission function (S25). When the corresponding terminal 1 is connected to another application function as a result of the determination, the priority calculating unit 30 determines the corresponding terminal 1 as the terminal of the third priority for maintaining the priority of the contact information and generates priority list information (S26).

Then, the priority calculating unit 30 determines other terminals, of which the priorities are not determined in operations S20 to S26 among the terminals connected through communication in operation S11, as the terminals of the fourth priority for maintaining the priority of the contact information and generates priority list information (S27).

Figure 4:
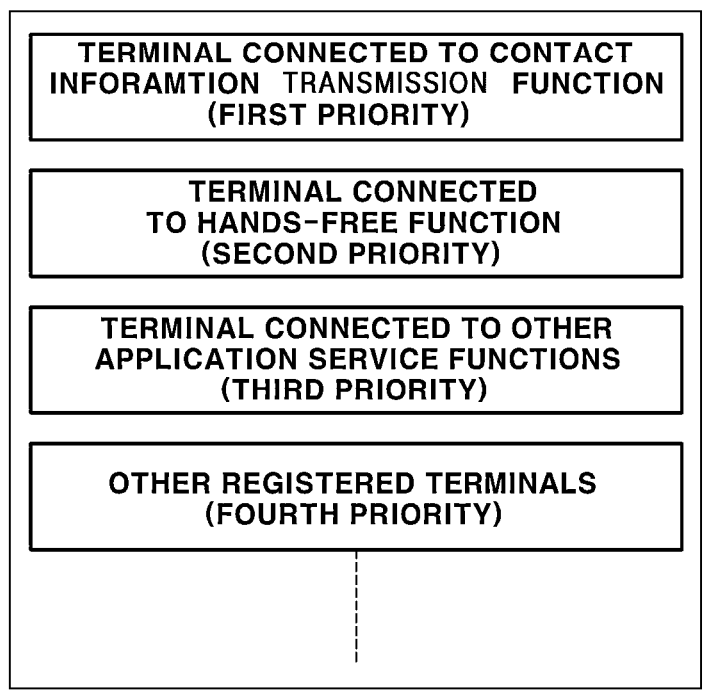
FIG. 4 is a diagram illustrating an example of a record of priority list information by the method of managing contact information of the present disclosure.

Accordingly, FIG. 4 illustrates an example of the record of the priority list information by the method of managing contact information of the present disclosure. In the priority list information for maintaining the priority of the contact information generated as the result of the calculation of the priority calculating process S2 of the present disclosure, the first priority is as the terminal connected to the contact information transmission function. The second priority is as the terminal connected to the hands-free function. The third priority is as the terminal connected to another application function. The fourth priority is determined as the terminals of which the priorities are not determined from the first to third priorities.

3) Contact Information Renewing Process S3

When the priority list information is generated in the priority calculating process S2, the renewal of the contact information stored in the linked database 50 is started according to the corresponding priority list information (S30), and the contact information renewing unit 40 searches the database 50 and determines whether a storage space for storing the contact information is insufficient (S31).

When the storage space for storing the contact information is not insufficient in the database 50 as a result of the determination of operation S31, the contact information renewing unit 40 downloads the contact information from the terminal 1 connected through communication and stores the downloaded contact information in the database 50, and renews the contact information included in the database 50 (S34).

However, when the storage space is insufficient in the database 50 as the result of the determination of operation S31, the contact information renewing unit 40 determines whether an attempt to connect to the terminals 1 registered in the AVN system of the vehicle of operation S11 is terminated (S32). When the attempt to connect is not terminated, the operation returns to operation S30, and when the attempt to connect is terminated, the contact information renewing unit 40 deletes the contact information of the terminal 1 corresponding to the last priority in the database 50 with reference to the priority list information generated in the priority calculating process S2 (S33). Then, the contact information renewing unit 40 downloads the contact information from the corresponding terminal 1, stores the downloaded contact information in the database 50, and then renews the contact information (S34).

Accordingly, by the method of managing contact information of the present disclosure, the priorities of the terminals are set according to the function used by the terminals connected with the AVN system through communication among the terminals using the functions provided by the AVN system of the vehicle and the contact information stored in the terminals is renewed in the database according to the set priority. Thus, the method shortens a standby time for using the function provided by the AVN system using the contact information of the terminal and improves user's convenience.

What is claimed is:

1. A system for managing contact information of a terminal recognized by a vehicle, the system comprising:
   a communication unit, which communicates with one or more terminals located in a vehicle and recognizes the terminal, and receives information stored in the recognized terminal;
   a connection confirming unit, which confirms a function, to which the terminal recognized through the communication unit is connected through communication, among the functions provided by an Audio, Video, and Navigation (AVN) system of the vehicle;
   a priority calculating unit, which calculates a priority of the corresponding terminal with respect to other terminals according to the connection between the terminal confirmed by the connection confirming unit and the function provided by the AVN system and generates priority list information for maintaining contact information stored in the terminal; and
   a contact information renewing unit, which downloads and stores the contact information stored in the terminal in a linked database according to the priority list information generated by the priority calculating unit or deletes the contact information stored in the database.

2. A method of managing contact information of a terminal recognized by a vehicle, the method being performed by a system for managing contact information including the communication unit communicating with one or more terminals located in a vehicle, a connection confirming unit, a priority calculating unit, and a contact information renewing unit, the method comprising:
   a connection confirming process of confirming a function, to which the terminal located in the vehicle and recognized by the communication unit is connected through communication, among the functions provided by an Audio, Video, and Navigation (AVN) system of the vehicle, which is performed by the connection confirming unit;
   a priority calculating process of calculating a priority of the corresponding terminal with respect to other terminals according to the connection between the terminal confirmed in the connection confirming process and the function provided by the AVN system and generating priority list information for maintaining contact information stored in the terminal, which is performed by the priority calculating unit; and
   a contact information renewing process of downloading and storing the contact information stored in the terminal in a linked database according to the priority list information generated by the priority calculating process or deleting the contact information stored in the database, which is performed by the contact information renewing unit.

3. The method of claim 2, wherein the connection confirming process includes:
   an operation in which when the terminal of a user is located in the vehicle, the communication unit starts a connection with the terminals registered in the AVN system of the vehicle through communication;
   an operation in which the connection confirming unit determines whether the terminal registered in the AVN system of the vehicle is connected through communication as a result of the connection with the communication unit through communication, and when the communication terminal is connected through communication, the connection confirming unit determines whether the corresponding terminals is connected with a hands-free function provided by the AVN system of the vehicle through communication;
   an operation in which when the corresponding terminal is connected with a hands-free function through communication as a result of the determination of operation, a priority calculating starting operation for performing the priority calculating process is performed, and when the corresponding terminal is not connected with a hands-free function through communication, the connection confirming unit determines whether the corresponding terminal is connected with a contact information transmission function provided by the AVN system of the vehicle through communication;
   an operation in which when the corresponding terminal is connected with the contact information transmission function through communication as a result of the determination of operation, the priority calculating starting operation for performing the priority calculating process is performed, and when the corresponding terminal is not connected with the contact information transmission function through communication, the connection confirming unit determines whether the contact information of the corresponding terminal is previously stored and exists in the AVN system of the vehicle;
   an operation in which when the contact information of the corresponding terminal is previously stored and exists as a result of the determination of operation, the priority calculating starting operation for performing the priority calculating process is performed, and when the contact information of the corresponding terminal is not previously stored and does not exist, the connection confirming unit determines whether the corresponding terminal is connected to another application function provided by the AVN system of the vehicle, other than the hands-free function or the contact information transmission function, through communication; and
   an operation in which when the corresponding terminal is connected to another application function through communication as a result of the determination of operation, the priority calculating starting operation for performing the priority calculating process is performed, and when the corresponding terminal is not connected to another application function through communication, the connection confirming unit changes a communication target to a terminal of a next order and starts a connection through communication.

4. The method of claim 3, wherein another application function provided by the AVN system of the connection confirming process is any one of a function of transmitting or receiving a text message or an SNS message to or from a contact stored in the terminal, and an audio and video streaming function of streaming and playing an audio file, a video file, and the like stored in the terminal.

5. The method of claim 2, wherein the priority calculating process includes:
   determining, by the priority calculating unit, whether the corresponding terminal is connected to the contact information transmission function, and when the corresponding terminal is connected to the contact information transmission function as a result of the determination, determining, by the priority calculating unit, the corresponding terminal 1 as the terminal of the first priority for maintaining the priority of the contact information and generating priority list information; and when the corresponding terminal is not connected to the contact information transmission function as a result of the determination of operation, determining, by the priority calculating unit, whether the corresponding terminal is connected to the hands-free function, and when the corresponding terminal is connected to the hands-free function as a result of the determination, determining, by the priority calculating unit, the corresponding terminal as the terminal of the second priority for maintaining the priority of the contact information and generating priority list information.

6. The method of claim 5, wherein the priority calculating process further includes:

when the corresponding terminal is not connected to the hands-free function as a result of the determination of operation, determining, by the priority calculating unit, whether the corresponding terminal is connected to another application function provided by the AVN system of the vehicle, other than the hands-free function or the contact information transmission function, and when the corresponding terminal is connected to another application function as a result of the determination, determining, by the priority calculating unit, the corresponding terminal as the terminal of the third priority for maintaining the priority of the contact information and generating priority list information; and determining, by the priority calculating unit, other terminals, of which the priorities are not determined in operations among the terminals connected through communication in operation, as the terminals of the fourth priority for maintaining the priority of the contact information and generating priority list information.

7. The method of claim 2, wherein the contact information renewing process includes:

when the priority list information is generated in the priority calculating process, starting a renewal of the contact information, and searching, by the contact information renewing unit, the database and determining whether a storage space for storing the contact information is insufficient;

when the storage space for storing the contact information is not insufficient in the database as a result of the determination of operation, downloading the contact information from the terminal and storing the downloaded contact information in the database, and renewing the contact information included in the database; and when the storage space is insufficient in the database as the result of the determination of operation, determining whether an attempt to connect to the terminals registered in the AVN system of the vehicle of operation is terminated, and when the attempt to connect is terminated, deleting, by the contact information renewing unit, the contact information of the terminal corresponding to the last priority in the database with reference to the priority list information generated in the priority calculating process, and then downloading the contact information from the corresponding terminal, storing the downloaded contact information in the database, and then renewing the contact information.

* * * * *